(12) United States Patent
Jiang et al.

(10) Patent No.: US 10,484,980 B1
(45) Date of Patent: Nov. 19, 2019

(54) LINK LAYER SERVICE PLATFORM

(71) Applicant: Marvell International Ltd., Hamilton (BM)

(72) Inventors: Jinjing Jiang, San Jose, CA (US); Liwen Chu, San Ramon, CA (US); Lei Wang, San Diego, CA (US); Yakun Sun, San Jose, CA (US); Hongyuan Zhang, Fremont, CA (US); Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 159 days.

(21) Appl. No.: 15/488,281

(22) Filed: Apr. 14, 2017

Related U.S. Application Data

(60) Provisional application No. 62/322,727, filed on Apr. 14, 2016.

(51) Int. Cl.
| | |
|---|---|
| *H04W 4/00* | (2018.01) |
| *H04W 72/04* | (2009.01) |
| *H04W 56/00* | (2009.01) |
| *H04W 84/04* | (2009.01) |
| *H04W 84/12* | (2009.01) |
| *H04W 88/06* | (2009.01) |
| *H04W 4/80* | (2018.01) |

(52) U.S. Cl.
CPC ....... *H04W 72/042* (2013.01); *H04W 56/001* (2013.01); *H04W 4/80* (2018.02); *H04W 84/042* (2013.01); *H04W 84/12* (2013.01); *H04W 88/06* (2013.01)

(58) Field of Classification Search
CPC ...... H04W 72/04; H04W 88/08; H04W 76/00
See application file for complete search history.

(56) References Cited

U.S. PATENT DOCUMENTS

| | | | |
|---|---|---|---|
| 2007/0042716 A1 * | 2/2007 | Goodall | G05D 1/0274 |
| | | | 455/67.11 |
| 2013/0016635 A1 * | 1/2013 | Linsky | H04W 72/1215 |
| | | | 370/280 |

(Continued)

OTHER PUBLICATIONS

"IEEE Standard for information technology—Telecommunication and information exchange between systems/Local and metropolitan area networks—Specific requirements, Part 11: Wireless LAN medium Access Control (MAC) and Physical Layer (PHY) Specifications", IEEE Standards Association, IEEE Computer Society, IEEE Std 802.11™—2012, Mar. 9, 2012.

*Primary Examiner* — Siren Wei

(57) ABSTRACT

Systems, devices, and techniques relating to a link layer service platform (LSP) that provides, among other things, assisted multi-band wireless communications are described. A described device includes a first radio to transmit and receive based on a first wireless protocol; a second radio to transmit and receive based on a second wireless protocol, the second wireless protocol being different from the first wireless protocol; and a controller to use the first radio to assist communications via the second radio. The controller can be configured to cause the first radio to transmit, receive, or both one or more control frames associated with the second wireless protocol using the first wireless protocol, and cause the second radio to transmit or receive one or more data frames using the second wireless protocol in accordance with the one or more control frames.

17 Claims, 7 Drawing Sheets

(56) References Cited

U.S. PATENT DOCUMENTS

| | | | |
|---|---|---|---|
| 2013/0088983 A1* | 4/2013 | Pragada | H04W 16/14 370/252 |
| 2014/0206368 A1* | 7/2014 | Maltsev | H04W 72/0406 455/450 |
| 2014/0206406 A1* | 7/2014 | Cordeiro | H04W 72/046 455/501 |
| 2014/0307821 A1* | 10/2014 | Zhang | H04L 25/03904 375/267 |
| 2016/0014667 A1* | 1/2016 | Sirotkin | H04W 4/70 370/252 |
| 2016/0143074 A1* | 5/2016 | Wietfeldt | H04B 15/00 370/329 |
| 2017/0127330 A1* | 5/2017 | Payyappilly | H04W 24/10 |

* cited by examiner

LINK LAYER SERVICE PLATFORM

CROSS REFERENCE TO RELATED APPLICATIONS

This present disclosure claims the benefit of the priority of U.S. Provisional Application Ser. No. 62/322,727, filed Apr. 14, 2016, and entitled "LINK LAYER SERVICE PLATFORM," which is incorporated herein by reference in its entirety.

BACKGROUND

This disclosure relates to wireless communication systems, including Wireless Local Area Networks (WLANs).

Wireless communication systems can include multiple wireless communication devices that communicate over one or more wireless channels. When operating in an infrastructure mode, a wireless communication device called an access point (AP) provides connectivity with a network, such as the Internet, to other wireless communication devices, which can be referred to as client stations (STAs), client devices, clients, access terminals (ATs). Various examples of wireless communication devices include mobile phones, smart phones, wireless routers, and wireless hubs. In some cases, wireless communication electronics are integrated with data processing equipment such as laptops, personal digital assistants, and computers.

Wireless communication devices in a WLAN can use one or more protocols for a medium access control (MAC) layer and a physical (PHY) layer. For example, a wireless communication device can use a Carrier Sense Multiple Access (CSMA) with Collision Avoidance (CA) based protocol for a MAC layer and Orthogonal Frequency Division Multiplexing (OFDM) for the PHY layer. The MAC layer can communicate with a Physical Layer Convergence Protocol (PLCP) sublayer. After receiving a MAC protocol data unit (MPDU) from the MAC layer, the PLCP sublayer can include PHY specific preamble fields to form a PLCP protocol data unit (PPDU) for transmission. A MPDU can also be called a PLCP service data unit (PSDU).

Wireless communication systems, such as WLANs, can use one or more wireless communication technologies, such as OFDM for a physical (PHY) layer. In an OFDM based wireless communication system, a data stream is split into multiple data substreams. Such data substreams are sent over different OFDM subcarriers, which are commonly also referred to as tones or frequency tones. WLANs such as those defined in the Institute of Electrical and Electronics Engineers (IEEE) wireless communications standards, e.g., IEEE 802.11n, IEEE 802.11ac, and IEEE 802.11ax can use OFDM to transmit and receive signals.

In other IEEE 802.11 protocols such as IEEE 802.11ad and 802.11ay, Directional Multi-Gigabit (DMG) and Enhanced DMG (EDMG) control frames are defined that enable wireless devices to communicate in high band frequencies such as those above 45 GHz including a 60 GHz band. A DMG or EDMG enabled device can transmit during a Beacon Interval (BI) that includes a Beacon Header Interval (BHI) and a Data Transmission Interval (DTI). The BHI can include a Beacon Transmission Interval (BTI). The DTI can include one or more Contention-Based Access Periods (CBAPs), scheduled Service Periods (SPs), or both. In some configurations, the BHI includes an Association Beamforming Training (A-BFT) period, an Announcement Transmission Interval (ATI) period, or both.

SUMMARY

The present disclosure includes systems, devices, and techniques for a link layer service platform (LSP) that provides, among other things, assisted multi-band wireless communications. According to an aspect of the present disclosure, a LSP enabled device includes a first radio to transmit and receive based on a first wireless protocol; a second radio to transmit and receive based on a second wireless protocol, the second wireless protocol being different from the first wireless protocol; and a controller to use the first radio to assist communications via the second radio. The controller can be configured to cause the first radio to transmit, receive, or both one or more control frames associated with the second wireless protocol using the first wireless protocol, and cause the second radio to transmit or receive one or more data frames using the second wireless protocol in accordance with the one or more control frames.

This and other implementations can include one or more of the following features. The one or more control frames can include network announcement information associated with the second wireless protocol. The controller can be configured to use the first radio and the first wireless protocol to perform an association exchange to enable communications via the second radio and the second wireless protocol. In some implementations, the one or more control frames includes an encapsulated control frame. The controller can be configured to pass, via a link layer service component, at least a portion of the encapsulated control frame to a MAC entity associated with the second wireless protocol. In some implementations, the controller is configured to use information received via the first radio using the first wireless protocol to control a beamforming training process carried out via the second radio using the second wireless protocol. The controller can be configured to use the information to reduce a number of antenna sectors to sweep during the beamforming training process. The controller can be configured to maintain a clock synchronization between the first wireless protocol and the second wireless protocol. In some implementations, the first wireless protocol is associated with a 2.4 GHz or a 5 GHz frequency band, and the second wireless protocol is associated with a 60 GHz frequency band.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, one or more disclosed embodiments can be implemented in various systems and apparatus, including, but not limited to, a special purpose data processing apparatus (e.g., a remote environment monitor, a router, a switch, a computer system component, a medium access unit), an automotive communication system, a mobile computer, a digital camera, a general purpose data processing apparatus such as a computer, or combinations of these.

In another aspect, an apparatus can include a first radio to transmit and receive based on a first wireless protocol; a second radio to transmit and receive based on a second wireless protocol, the second wireless protocol being different from the first wireless protocol; and a controller to use the first radio to assist communications via the second radio, wherein the controller is configured to cause the second radio to receive a request-to-send signal. The controller can be configured to cause the first radio to transmit a first clear-to-send signal in response to the request-to-send signal received via the second radio. The controller can be configured to cause the second radio to transmit a second clear-to-send signal in response to the request-to-send signal received via the first radio. The controller can be configured to cause the second radio to receive one or more data frames via the second radio after transmitting the first clear-to-send signal and the second clear-to-send signal.

This and other implementations can include one or more of the following features. The controller can be configured to maintain a clock synchronization between the first wireless protocol and the second wireless protocol. In some implementations, the second clear-to-send signal has a bandwidth that is narrower than the first clear-to-send signal. In some implementations, the second wireless protocol is not backwards compatible with the first wireless protocol. In some implementations, the first clear-to-send signal prevents devices that do not support the second wireless protocol from transmitting during a transmission of the one or more data frames. In some implementations, the first wireless protocol is associated with a 2.4 GHz or a 5 GHz frequency band, and the second wireless protocol is associated with a long range low power protocol.

In another aspect, a technique can include controlling a first radio of a device to transmit and receive based on a first wireless protocol; controlling a second radio of the device to transmit and receive based on a second wireless protocol, the second wireless protocol being different from the first wireless protocol; controlling the first radio to transmit, receive, or both one or more control frames associated with the second wireless protocol using the first wireless protocol, and controlling the second radio to transmit or receive one or more data frames using the second wireless protocol in accordance with the one or more control frames.

Particular configurations of the technology described in this disclosure can be implemented so as to realize one or more of the following potential advantages. Exchanging control signaling of a first wireless protocol through a second wireless protocol can increase the scalability of the first protocol, promote coexistence with a legacy protocol, accelerate beamforming training, or a combination thereof. A described technology can leverage the benefits of using omnidirectional transmissions for control-plane signaling and the benefits of using high frequency directional transmission for high rate data-plane transmissions. A described technology can be implemented within low-cost systems, low-power systems, or both types of systems. A described technology can facilitate offloading of data traffic from a crowded low frequency band such as a 2.4 or 5G band to a high frequency band such as a 60G band. A described technology can be applied to multi-band devices and various network technologies such as IEEE 802.11, Long Term Evolution (LTE), and Bluetooth Low Energy (BLE).

Details of one or more implementations are set forth in the accompanying drawings and the description below. Other features and advantages may be apparent from the description and drawings, and from the claims.

DRAWING DESCRIPTIONS

Like reference symbols in the various drawings indicate like elements.

DETAILED DESCRIPTION

A wireless device can include multiple co-existing physical (PHY) interfaces and medium access control (MAC) entities. Different PHY interfaces can possess different capabilities such as power consumption, range, data rate, or a combination thereof. Different PHY interfaces can be targeted for different usage scenarios. Moreover, different PHY interfaces can provide different transmission modalities such as omnidirectional transmissions and directional transmissions.

A low-band PHY (LB-PHY) such as a 2.4G or 5G frequency band PHY based on an IEEE 802.11 standard such as 802.11n, 802.11ac, or 802.11ax standard can use omnidirectional transmissions. A high-band PHY (HB-PHY) such as a 60G frequency band PHY based on an IEEE 802.11ad or 802.11ay protocol can use directional transmissions due to the high frequency nature of the protocol. A high-band refers to frequencies at or above about 30 GHz such as a 60G frequency band. Note that "2.4G" and "5G" and "60G" refer to respective GHz frequency ranges. The IEEE 802.11 standards provide additional details regarding these bands. For example, the 60G band can refer to a range of frequencies from about 57 GHz to about 66 GHz.

A low-band PHY can provide for an easier control and management exchange via omnidirectional transmissions that alleviates the problem of deaf devices, e.g., devices that are not able to detect a transmission. Further, a low-band PHY typically provides a longer range than a high-band PHY. The higher data throughput offered by a 60G band directional transmission can support bandwidth intensive applications such as wireless laptop docking and wireless virtual reality gear. Further, using a high-band can offload data traffic from the typically crowded 2.4/5G bands.

This disclosure describes a Link Layer Service Platform (LSP) that enables a synergy among different PHY interfaces such that a PHY interface of a wireless device can be used to assist another PHY interface of the device. For example, a wireless device can include a 2.4/5G PHY interface and another PHY interface such as a 60G PHY interface for high bandwidth communication or a Long Range Low Power (LRLP) PHY interface. In some implementations, the LSP can use the 2.4/5G PHY interface for control-plane signaling associated with the 60G PHY, while keeping the data-plane transactions on the 60G PHY. In some implementations, a device's low data rate but long range PHY can assist another co-existing PHY in the same device to maintain a link. For example, a device can switch from a LRLP PHY/MAC to IEEE 802.11ac or 802.11ax PHY/MAC when required to transmit or receive a high data rate burst.

Figure 1:
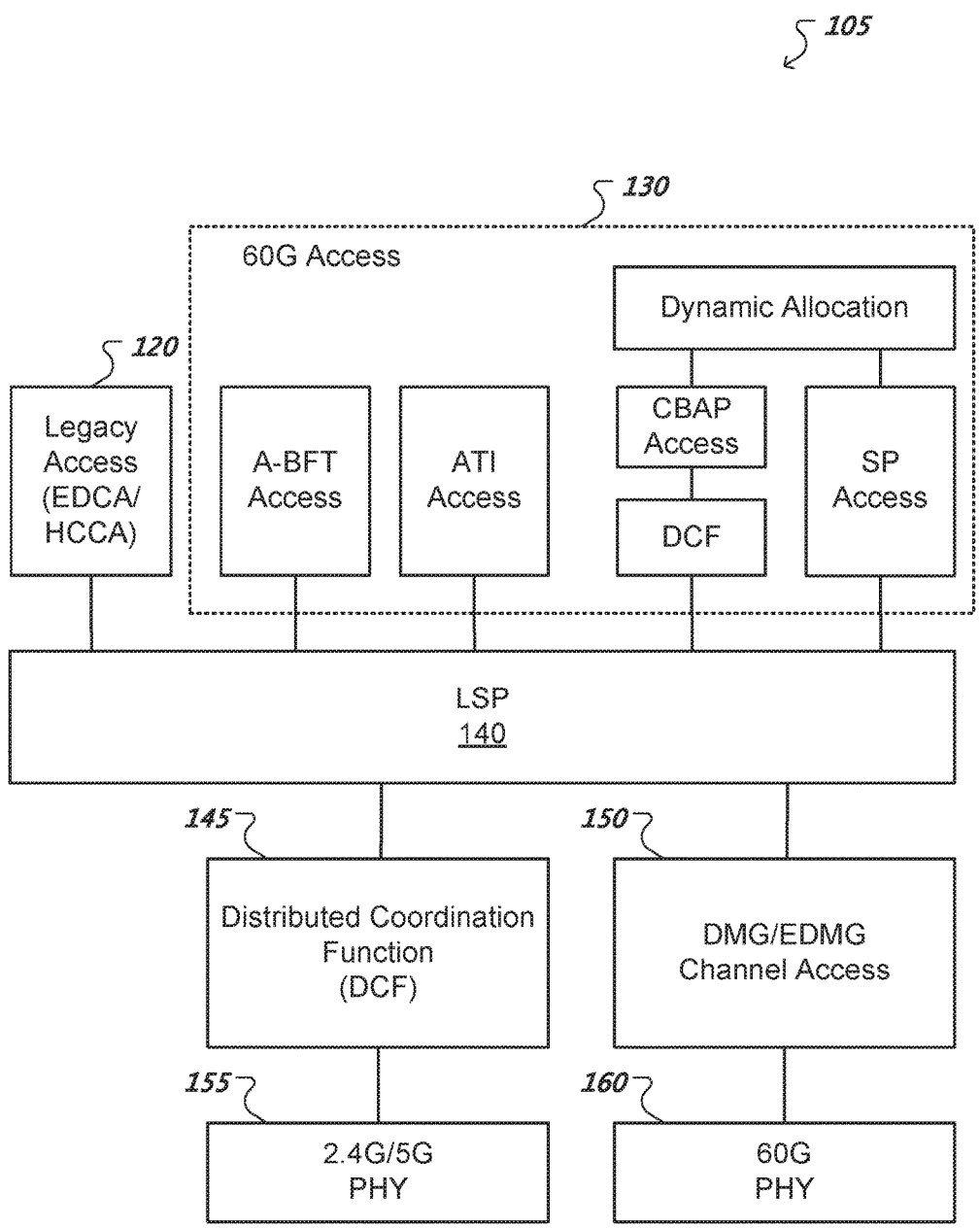
FIG. 1 shows a communication stack of an example of a wireless device that includes a LSP.

FIG. 1 shows a communication stack of an example of a wireless device 105 that includes a link layer service platform 140. The device 105 supports multiple access functions 120, 130 and corresponding PHY interfaces 155, 160. The device 105 provides legacy access functions 120 such as Enhanced distributed channel access (EDCA) and HCF (hybrid coordination function) controlled channel access (HCCA). IEEE 802.11 protocols such as 802.11a/b/g/n, 802.11ac, or 802.11ax provide additional details about the legacy access functions 120. The device 105 provides 60G access functions 130 including dynamic allocation, CBAP access, Distributed Coordination Function (DCF), and SP access. The dynamic allocation function can switch between contention-based medium access, e.g., CBAP/DCF, and scheduled-based medium access, e.g., SP access. In some implementations, the 60G access functions 130 include A-BFT access, ATI access, or both. IEEE 802.11 protocols such as IEEE 802.11ad and 802.11ay provide additional details about the 60G access functions 130.

The device 105 includes a LSP 140 to management inter-stack interactions among a device's supported wireless protocols and PHY interfaces 155, 160. Below the LSP 140 in FIG. 1, two pathways are depicted. A first pathway includes a DCF 145 and 2.4G/5G PHY 155. A second pathway includes DMG/EDMG Channel Access 150 and 60G PHY 160. Note that additional and different pathways are possible. The LSP 140 can cause 60G based control frames to be exchanged over the 2.4G/5G PHY 155 instead of the 60G PHY 160 in an assisted 60G operational mode. The LSP 140 can route 60G based control frames received via the 2.4G/5G PHY 155 to an appropriate 60G access function 130.

In some implementations, the LSP 140 uses omnidirectional transmissions in the 2.4G/5G bands for control and management of the 60G band such as link establishment, sector level sweep (SLS) setup, beam refinement phase (BRP) setup, and information for spatial reuse. The LSP can be agnostic to higher MAC layers, e.g., a 2.4/5G MAC or a 60G MAC, and associated functions 120, 130 to ensure necessary backward compatibility and interoperability. The assisted 60G operation does not interfere with the operation of the 60G-only devices in the same Basic Service Set (BSS). In some implementations, the 2.4/5G MAC entity serves as a pass-through and switches DMG or EDMG management and control frames to the 60G MAC entity. The 2.4/5G MAC entity can be configured via the LSP 140 to understand at least the DMG/EDMG management and control types and subtypes. In some implementations, tunneling can be used such that 60G MPDUs are tunneled over 2.4/5G MPDUs. In some implementations, a 2.4/5G control frame can include an encapsulated control frame for 60G, and the LSP 140 can be configured to pass at least a portion of the encapsulated control frame to a MAC entity associated with the 60G access functions 130.

In some implementations, the LSP 140 maintains clock synchronization among the access functions 120, 130 and corresponding MAC entities for different bands. Note that DMG/EDMG can have different timing due to the hybrid approach for medium access. For frames sent by a 2.4/5G MAC entity on behalf of 60G, the LSP 140 can cause the timing for medium access in 60G to be preserved, e.g., the LSP 140 helps the 2.4/5G MAC and PHY entity to access the medium at the time required by the 60G-based protocol. In some implementations, the LSP 140 maintains clock synchronization by tracking a time offset between a clock of 2.4G/5G PHY 155 and a clock of the 60G PHY 160. In some implementations, the LSP 140 maintains clock synchronization by using a single clock for both the 2.4G/5G PHY 155 and the 60G PHY 160.

Figure 2:
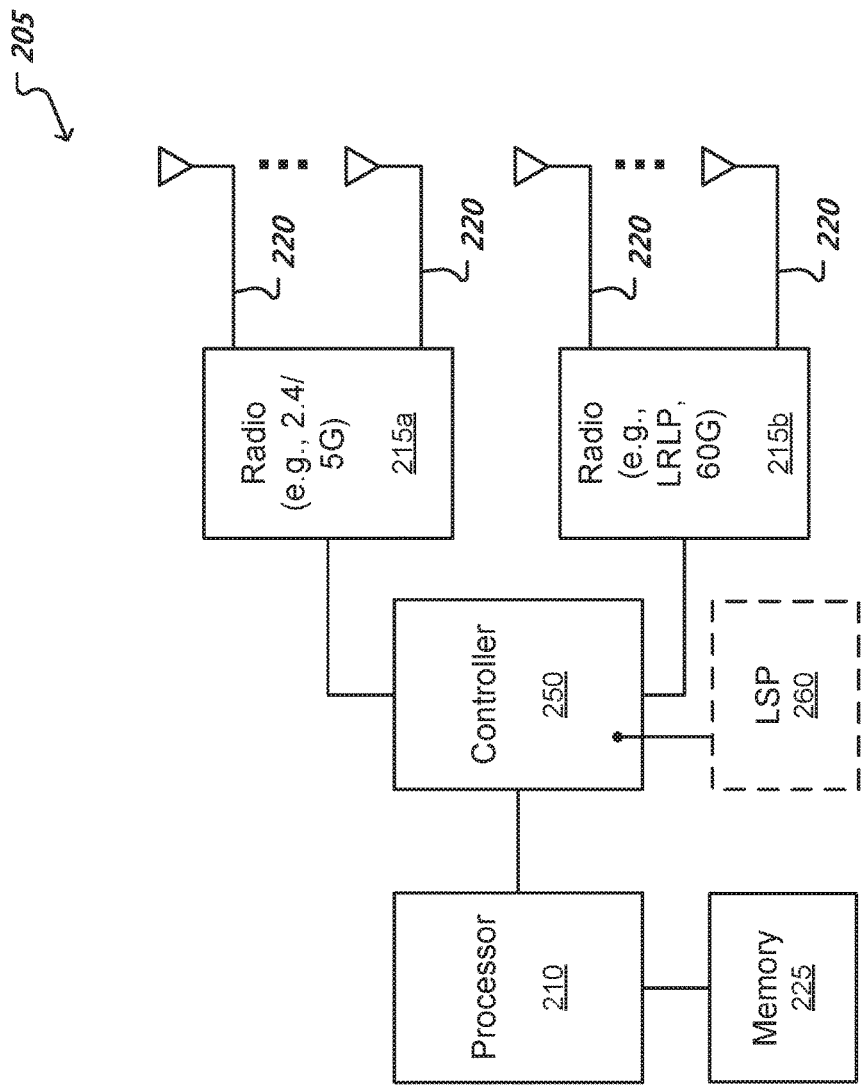
FIG. 2 shows a block diagram of an example of a LSP enabled wireless device.

FIG. 2 shows a block diagram of an example of a LSP enabled wireless device 205. The device 205 can implement methods effecting one or more techniques presented in this disclosure. Various examples of device 205 include an AP or a client wireless device. An AP can also be referred to as a base station (BS). In some implementations, an AP device can be referred to as a PBSS control point (PCP), where PBSS is an acronym for a personal basic service set. A client device can also be referred to as a STA or mobile station (MS). In some implementations, the device 205 can be operated as an AP or as a client depending on a configuration parameter.

The wireless device 205 includes two or more radios 215a-b to send and receive wireless signals. Each radio 215a-b is coupled with one or more antennas 220. In some implementations, the radios 215a-b use different sets of one or more antennas 220, each set being optimized for one or more frequencies bands. In some implementations, the radios 215a-b can use a same set of antennas 220. Each radio 215a-b implements a PHY interface. In some implementations, radio 215a includes a 2.4G/5G PHY, whereas radio 215b includes a 60G PHY or a LRLP PHY. A controller 250 can provide MAC layer functionality and transfer data among a processor 210 and the radios 215a-b. The controller 250 includes a LSP 260 to coordinate communications between the radios 215a-b. The device 205 includes the processor 210 and a memory 225. The memory 225 can store information such as data, instructions, or both. For example, the memory 225 can store instructions to cause the processor 210 to generate data for transmission and to process received data via the radios 215a-b. In some implementations, the LSP 260 is a part of a MAC controller, instructions in memory 225, or both. In some implementations, a link layer service component such as LSP 260 can pass an encapsulated control frame received via radio 215a to a MAC controller associated with the other radio 215b.

Under IEEE 802.11ad, intervals such as the BHI and the DTI are carried over a 60G PHY. However, a LSP can cause at least a portion of the BHI such as a BTI, A-BFT, or ATI to be carried out via one or more control frame exchanges via a 2.4/5G PHY. For example, a network announcement normally transmitted in a BTI using the 60G band can be transmitted in a 2.4/5G based beacon interval. In some implementations, the schedule for SP access in the Data Transmission Interval (DTI) can be exchanged in the 2.4/5G band instead of the 60G band. In some implementations, an AP device can use an extended schedule information element transmitted in the 2.4/5G band to provide a schedule for SP access in the 60G band.

Devices can use capability signaling to indicate support for assisted 60G operation. For example, a LSP-enabled wireless protocol can define a capability element to indicate whether a device includes a LSP and is capable of assisted 60G operation, e.g., using the 2.4/5G band to assist communications in the 60G band. In some implementations, the LSP enables a 2.4/5G MAC to understand a DMG or EDMG capability element. Through an association process, wireless devices such as an AP or client device can determine whether LSP is mutually supported, e.g., whether the medium access in 60G can be arranged through a frame exchange via 2.4/5G. If LSP is mutually supported, the 2.4/5G band can be used as the 60G-band's control-plane and the 60G band is used for exchanging data frames via the data-plane. If LSP is not mutually supported, then a device's 60G PHY can be used for the control-plane and data-plane.

Figure 3:
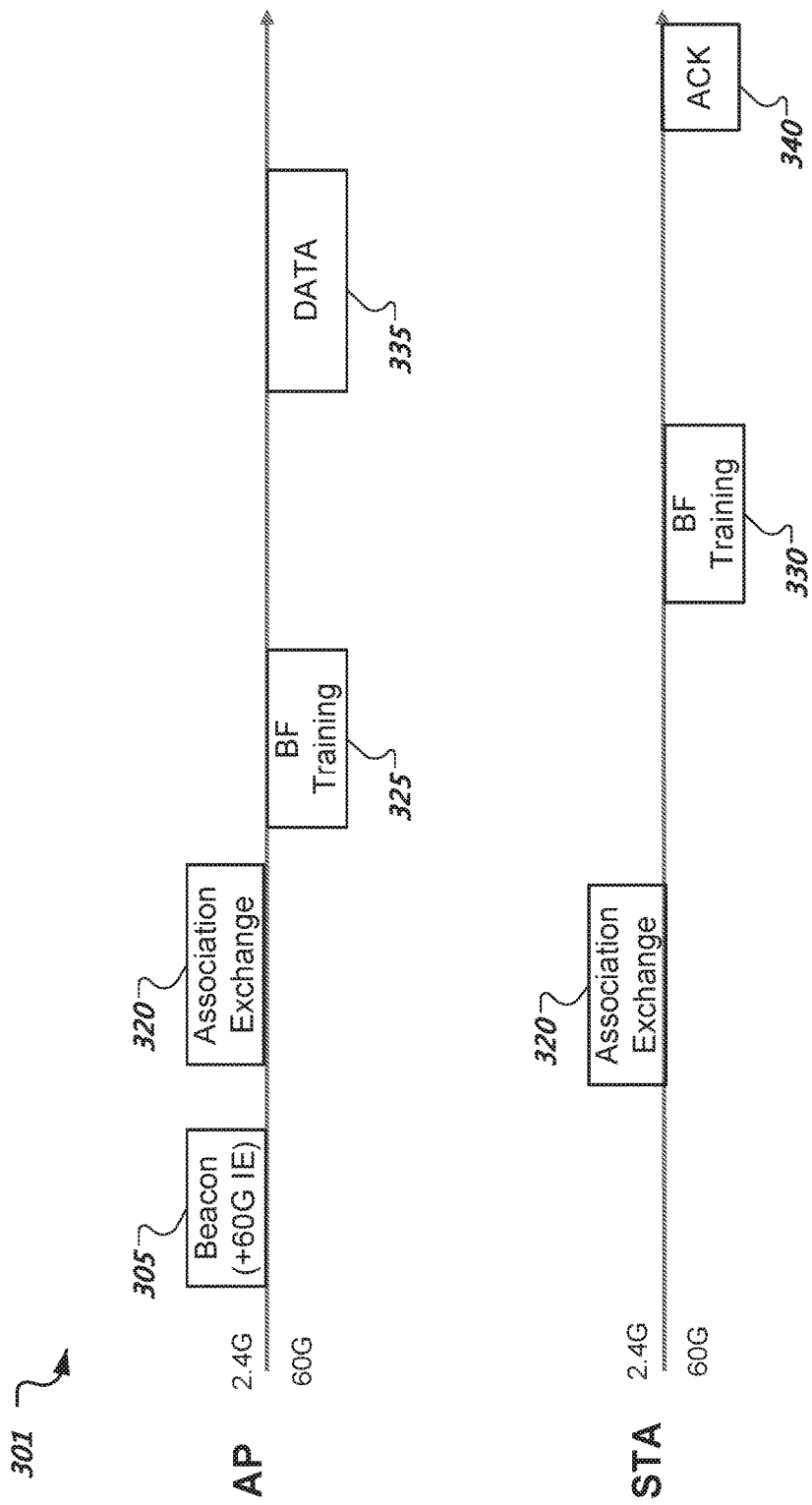
FIG. 3 shows an example of a communication sequence between LSP enabled wireless devices.

FIG. 3 shows an example of a communication sequence 301 between LSP enabled wireless devices. In this example, the AP device and client (labelled STA) device support communications on the 2.4G and the 60G band. Note that the devices can use the 5G band in addition to or in lieu of the 2.4G band. Further, other band options are possible. In the communication sequence 301, the AP device transmits a beacon 305 in the 2.4G band that advertises services on the 2.4G band and the 60G band. While the 2.4G band is depicted, the AP can transmit the beacon 305 in the 5G band if configured to do so. The client device receives the beacon 305, and initiates an association exchange 320 with the AP using the 2.4G band. During the association exchange 320, the client device uses an information element (IE) to indicate support for assisted 60G communications.

Based on both devices supporting 60G, the AP can initiate 60G communication procedures such as beamforming (BF) training. As depicted, the AP performs BF training 325 in the 60G band and the client device performs BF training 330 in the 60G band. BF training 325, 330 can include sweeping through one or more radial antenna sectors to determine an appropriate sector to use to transmit data to the other device or receive data from the other device. Note that, while not depicted, the devices can exchange beamforming training result such as an identification of a desirable sector to use for transmission. After BF training 325, 330 is completed, the AP transmits data 335 in the 60G band. Based on a successful receipt of the data 335, the client device transmits an acknowledgement (ACK) 340 in the 60G band.

In some implementations, the beacon 305 transmitted in the 2.4G or 5G band can include information based on a BTI defined by IEEE 802.11ad or 802.11ay. In some implementations, the AP can transmit the beacon 305 in the 2.4G or 5G band and an additional beacon in the 60G band. A beacon 305 can include network announcement information. In some implementations, a network announcement transmitted in the 60G band can include the same information transmitted in the 2.4/5G beacon. If network announcement information is received on the 2.4/5G band and the 60G band, the LSP can be configured to drop the 60G version of the information and use the 2.4/5G version of the information. In some implementations, a BTI is not required to be included in every beacon transmitted in the 2.4G or 5G band.

In some implementations, a BTI can include information used for beamforming training of the AP's antenna sectors. If antenna sector training or beam refining protocol is not performed in one or more previous time slots, a source and destination wireless device pair can start beamforming training before a data transmission in a designated SP. If new beamforming training is not required, an indication can be set in a scheduling element to bypass one or more phases of beamforming training. For example, an entire beamforming training procedure may not be required, and a scheduling element can indicate that a beam tracking procedure should be performed. After determining the strongest antenna sector to use for transmission, the AP can use a beam tracking procedure to make minor adjustments to the antenna sector, such as switching to an adjacent sector.

Figure 4:
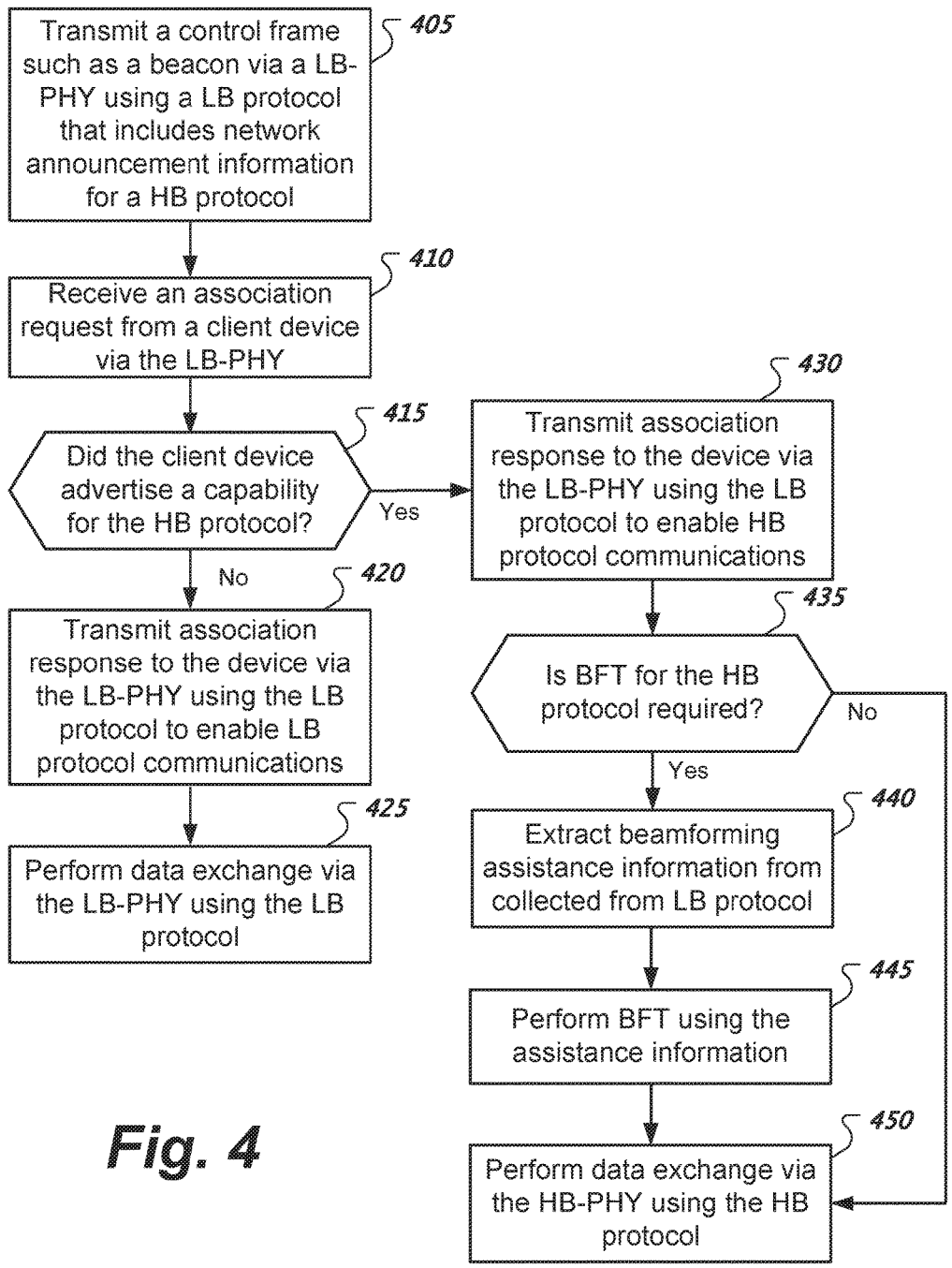
FIG. 4 shows a flowchart of an example of a process performed by an AP device that supports legacy and next generation protocols.

FIG. 4 shows a flowchart of an example of a process performed by an AP device that supports legacy and next generation protocols. At 405, the AP device transmits control frame such as a beacon via a low band PHY (LB-PHY) using a low band (LB) protocol that includes network announcement information for a high band (HB) protocol. Various examples of control frames includes beacons, management frames, and association requests and responses. The AP device, for example, can transmit a beacon via a LB-PHY, e.g., a 2.4G or 5G PHY, in accordance with an IEEE 802.11 standard such as 802.11n or 802.11ac. The network announcement information for a HB protocol transmitted via the LB protocol can include network announcement information based on a HB protocol such as IEEE 802.11ad or 802.11ay. In some implementations, the beacon includes a capability element to indicate that the AP is capable of LB assisted HB operation, e.g., assisted 60G operation.

At 410, the AP device receives an association request from a client device via the LB-PHY. At 415, the AP device determines whether the client device advertised a capability for the HB protocol. Determining whether the client device advertised a capability can include checking an association frame for a specific capability element. In some implementations, the client device can transmit a capability element during the association procedure to indicate that the client device is capable of LB assisted HB operation, e.g., assisted 60G operation.

If the HB protocol capability is not advertised by the client device, the AP device transmits an association response to the device via the LB-PHY using the LB protocol to enable LB protocol communications at 420. After the association exchange, the AP device performs a data exchange with the client device via the LB-PHY using the LB protocol at 425.

If the HB protocol capability is advertised by the client device, the AP device transmits an association response to the device via the LB-PHY using the LB protocol to enable HB protocol communications at 430. The AP device, at 435, determines whether beamforming training is required for the HB protocol. Determining whether beamforming training is required can include accessing a result of a previous beamforming training and determining whether the result is still relevant. If beamforming training is not required, the AP device continues at 450. If beamforming training is required, the AP device extracts beamforming assistance information, such as a neighborhood report or a location report, collected from the LB protocol at 440. In some implementations, instead of blindly starting beamforming training in accordance with a HB protocol, a wireless device pair can use assistance information collected via LSP from a LB-PHY to accelerate the beamforming training process associated with a HB-PHY.

At 445, the AP device performs beamforming training using the assistance information. In some implementations, information such as neighborhood report or a location report can enable a wireless device pair to down select antenna transmit and receive sectors such that not all sectors are required to be swept. For example, if the AP device knows the location of the STA device, essentially the AP knows which direction the transmission should be steered to, then the assistance information can reduce a number of antenna sectors that are required to be swept during the beamforming training. In some implementations, information such as a neighborhood report or a location report can enable the AP device to schedule a SP such that two pairs of devices can communicate in the same SP, because the AP device can estimate whether the two pairs of scheduled transmissions are orthogonal to each other. At 450, the AP device performs a data exchange via the HB-PHY using the HB protocol. In some implementations, the AP device maintains a clock synchronization between the LB-PHY and the HB-PHY to prevent time-out or out-of-order packet arrival scenarios.

Figure 5:
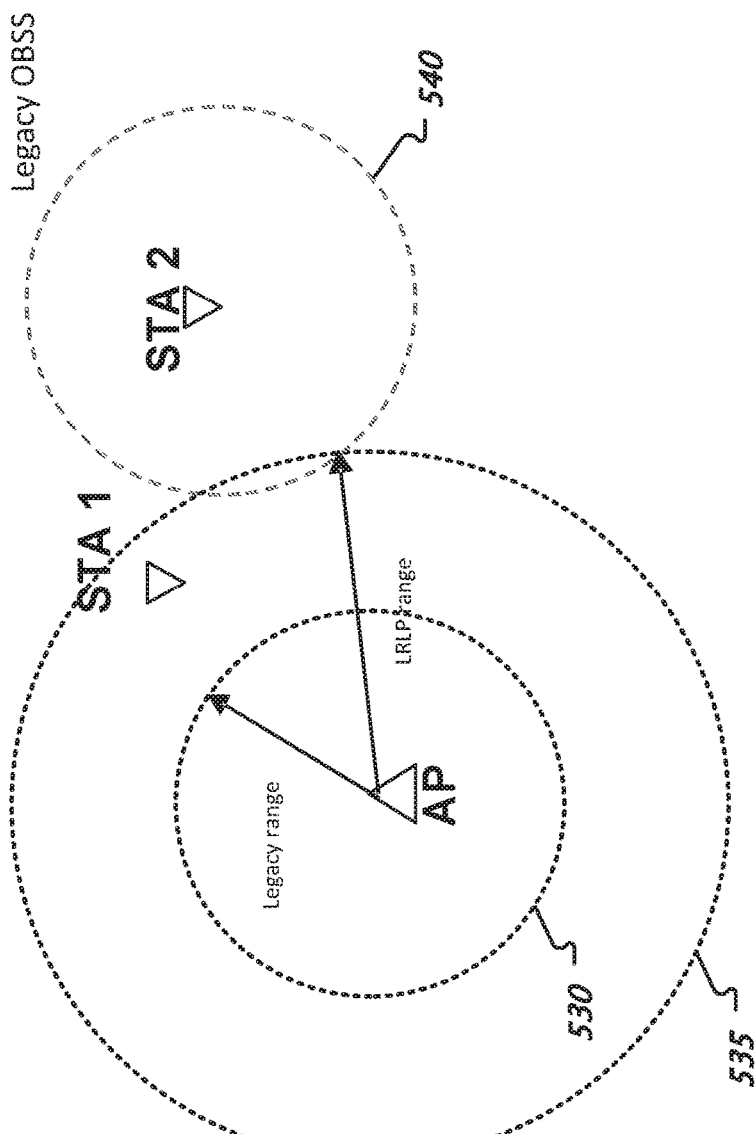
FIG. 5 shows an example of overlapping coverage among Long Range Low Power (LRLP) and non-LRLP-enabled wireless devices.

FIG. 5 shows an example of overlapping coverage among LRLP and non-LRLP-enabled wireless devices. In this example, the AP device provides legacy protocol service, e.g., 802.11b, 802.11n, 802.11ac etc., and LRLP protocol service. The STA1 device supports the legacy protocol and the LRLP protocol. While the STA2 device supports the legacy protocol, STA2 does not support the LRLP protocol. The AP device provides the legacy protocol service within a legacy range 530 as depicted in the figure. Further, the AP device provide the LRLP protocol service within a LRLP range 535 and has an associated LRLP BSS. The STA2 device has its own range 540 that overlaps with the LRLP range 535. The STA2 device has a legacy Overlapping BSS (OBSS) that is separate from the LRLP BSS.

The AP device's LRLP range 535 provides additional coverage compared to the legacy range 530. In some implementations, the LRLP protocol can utilize a narrow bandwidth, e.g., 2 MHz, in the 2.4G and 5G bands to extend the range of communications beyond that of legacy communications. In some implementations, a LRLP protocol can use a different PHY design such that the LRLP PPDU does not carry the legacy preamble. Due to the expanded coverage of the LRLP-enabled AP device and the use of a non-legacy preamble, the frame exchange among the LRLP-enabled AP and STA devices may interfere with STA2's ongoing transactions. Here, STA2 may not understand the LRLP based frames transmitted from the AP or STA1 due to the lack of a legacy preamble within the LRLP based frames. To co-exist with the STA2's legacy OBSS, the AP and STA1 can use a RTS/CTS based procedure that is compatible with the legacy protocol. The LSP can coordinate the procedure and make signaling decisions for multiple operational bands.

Figure 6:
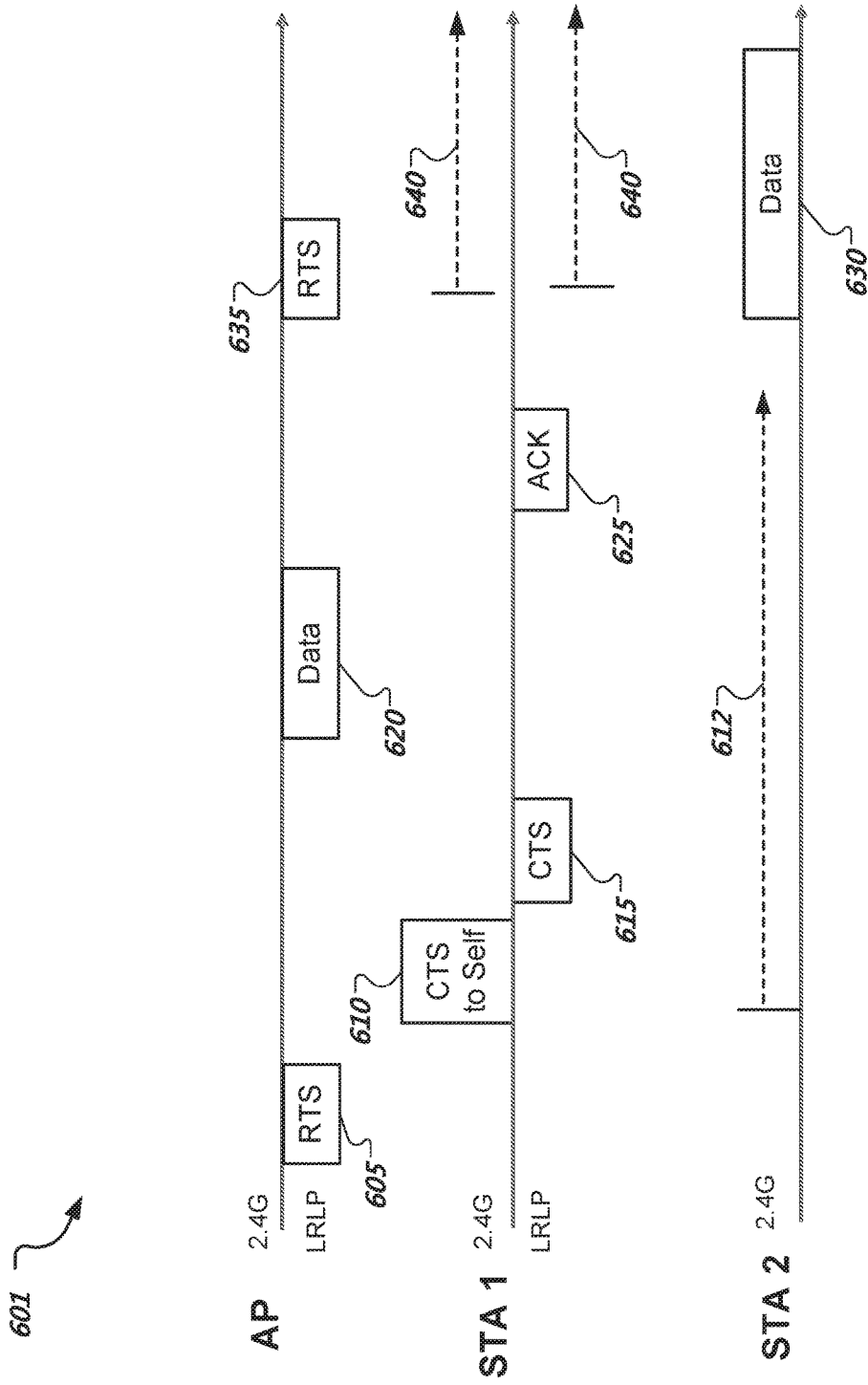
FIG. 6 shows an example of a communication sequence among the wireless devices shown in FIG. 5.

FIG. 6 shows an example of a communication sequence 601 among the wireless devices shown in FIG. 5. The AP and STA1 support legacy 2.4G PHY and LRLP-PHY based communications. The LRLP-PHY can use the 2.4G frequency, but is typically not backwards compatible with the legacy communications associated with the 2.4G PHY. Note that other frequency bands are possible. Recall that STA 2 does not support LRLP. In the communication sequence 601, the AP transmits a Request-to-Send (RTS) 605. In some implementations, the RTS 605 is transmitted in a narrow band for longer range. Responsive to receiving the RTS 605 via its LRLP-PHY, STA1 transmits a Clear-to-Send (CTS) via each of its PHYs including a CTS-to-Self 610 via its legacy 2.4G PHY and a CTS 615 via its LRLP-PHY. In some implementations, the CTS-to-Self 610 is a 20 MHz PPDU for legacy co-existence. The RTS and CTS are additional types of control frames. Based on receiving the CTS-to-Self 610, STA2 will consider the medium to be busy 612 for a period of time. Based on receiving the CTS 615 via the AP's LRLP-PHY, the AP transmits data 620 via the LRLP-PHY. STA1 transmits an ACK 625 via STA1's LRLP-PHY after successfully receiving the data 620.

After a period amount of time, STA2 will contend for the medium and transmit data 630 via its legacy 2.4G PHY. The AP, being out of range of STA2, transmits a RTS 635 via its LRLP-PHY. However, this time STA1 does not transmit a CTS because STA1 considers the medium busy 640 for both 2.4G and LRLP communications based on a detection of the transmission of data 630 from STA2. In some implementations, based on inter-PHY clock synchronization, STA1 considers the medium busy 640 for both 2.4G and LRLP communications based on the detection of data 630 from STA2.

Figure 7:
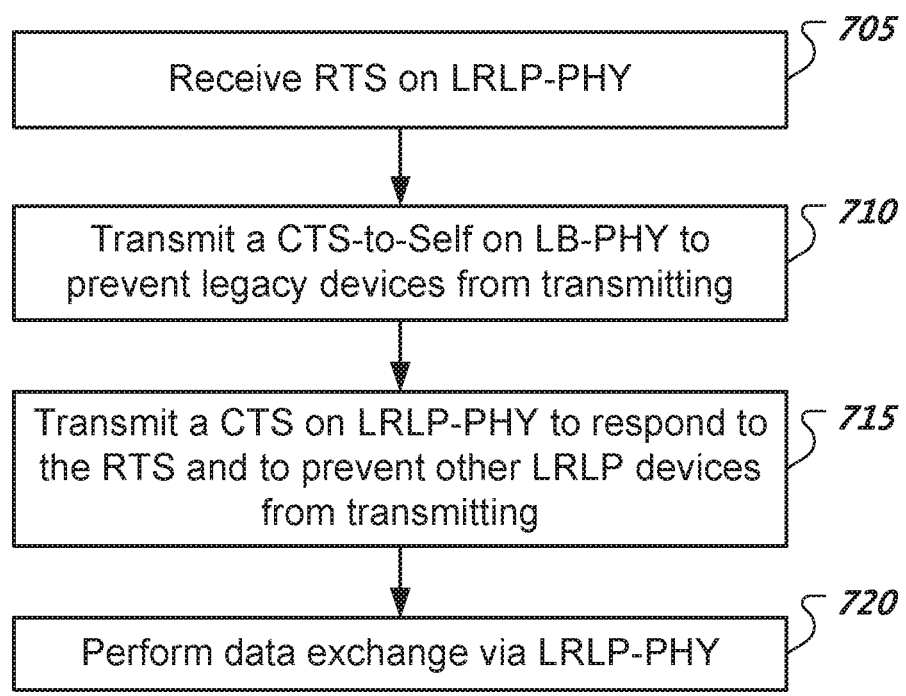
FIG. 7 shows a flowchart of an example of a process performed by a wireless device that supports legacy and LRLP protocols.

FIG. 7 shows a flowchart of an example of a process performed by a wireless device that supports a legacy and LRLP protocols. The wireless device includes a legacy PHY such as a 2.4G PHY or a 5G PHY and a LRLP-PHY. In some implementations, the LRLP-PHY and associated protocol is not backwards compatible with the legacy PHY and its associated protocol. At the 705, a wireless device receives a RTS on the device's LRLP-PHY. At the 710, the device transmits a CTS-to-self on the device's LB-PHY to prevent legacy devices from transmitting. At the 715, the device transmits a CTS on LRLP-PHY to respond to the RTS and to prevent other LRLP devices from transmitting. In some implementations, the CTS transmitted on the LRLP-PHY has a bandwidth that is narrower than that of the CTS-to-self transmitted on the LB-PHY. In some implementations, the device maintains a clock synchronization between the legacy and LRLP protocols. At the 720, the device performs a data exchange via the device's LRLP-PHY.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

What is claimed is:

1. An apparatus comprising:
  a first radio to transmit and receive based on a first wireless protocol;
  a second radio to transmit and receive based on a second wireless protocol, wherein the second wireless protocol is different than the first wireless protocol; and
  a controller to
    use the first radio to assist communications via the second radio including causing the first radio to at least one of transmit or receive one or more control frames associated with the second wireless protocol using the first wireless protocol,
    use information received via the first radio using the first wireless protocol to control a beamforming training process carried out via the second radio using the second wireless protocol,
    use the information to reduce a number of antenna sectors to sweep during the beamforming training process, and
    cause the second radio to transmit or receive one or more data frames using the second wireless protocol in accordance with the one or more control frames.

2. The apparatus of claim 1, wherein:
  the one or more control frames comprise network announcement information associated with the second wireless protocol; and
  the controller is configured to use the first radio and the first wireless protocol to perform an association exchange to enable communications via the second radio and the second wireless protocol.

3. The apparatus of claim 1, wherein:
  the one or more control frames comprise an encapsulated control frame; and
  the controller is configured to pass, via a link layer service component, at least a portion of the encapsulated control frame to a medium access control entity associated with the second wireless protocol.

4. The apparatus of claim 1, wherein the controller is configured to maintain a clock synchronization between the first wireless protocol and the second wireless protocol.

5. The apparatus of claim 1, wherein:
  the first wireless protocol is associated with a 2.4 GHz frequency band or a 5 GHz frequency band; and
  the second wireless protocol is associated with a 60 GHz frequency band.

6. An apparatus comprising:
  a first radio to transmit and receive based on a first wireless protocol;
  a second radio to transmit and receive based on a second wireless protocol, wherein the second wireless protocol is different than the first wireless protocol; and
  a controller to
    use the first radio to assist communications via the second radio,
    cause the second radio to receive a request-to-send signal,
    cause the first radio to transmit a first clear-to-send signal in response to the request-to-send signal received via the second radio,
    cause the second radio to transmit a second clear-to-send signal in response to a request-to-send signal received via the first radio, and
    cause the second radio to receive one or more data frames via the second radio after transmitting the first clear-to-send signal and the second clear-to-send signal.

7. The apparatus of claim 6, wherein the controller is configured to maintain a clock synchronization between the first wireless protocol and the second wireless protocol.

8. The apparatus of claim 6, wherein the second clear-to-send signal has a bandwidth that is narrower than the first clear-to-send signal.

9. The apparatus of claim 6, wherein the second wireless protocol is not backwards compatible with the first wireless protocol.

10. The apparatus of claim 6, wherein the first clear-to-send signal prevents devices that do not support the second wireless protocol from transmitting during a transmission of the one or more data frames.

11. The apparatus of claim 6, wherein:
  the first wireless protocol is associated with a 2.4 GHz frequency band or a 5 GHz frequency band; and
  the second wireless protocol is associated with a long range low power protocol.

12. A method comprising:
  controlling a first radio of a device to transmit and receive based on a first wireless protocol;
  controlling a second radio of the device to transmit and receive based on a second wireless protocol, wherein the second wireless protocol is different than the first wireless protocol;
  controlling the first radio to at least one of transmit or receive one or more control frames associated with the second wireless protocol using the first wireless protocol;
  using information received via the first radio using the first wireless protocol to control a beamforming training process carried out via the second radio using the second wireless protocol;
  using the information to reduce a number of antenna sectors to sweep during the beamforming training process; and
  controlling the second radio to transmit or receive one or more data frames using the second wireless protocol in accordance with the one or more control frames.

13. The method of claim 12, further comprising using the first radio and the first wireless protocol to perform an association exchange to enable communications via the second radio and the second wireless protocol, wherein the one or more control frames comprise network announcement information associated with the second wireless protocol.

14. The method of claim 12, further comprising passing, via a link layer service component, at least a portion of an encapsulated control frame to a medium access control entity associated with the second wireless protocol, wherein the one or more control frames comprise the encapsulated control frame.

15. The method of claim 12, further comprising maintaining a clock synchronization between the first wireless protocol and the second wireless protocol.

16. The method of claim 12, wherein:
the first wireless protocol is associated with a 2.4 GHz frequency band or a 5 GHz frequency band; and
the second wireless protocol is associated with a 60 GHz frequency band.

17. The apparatus of claim 1, wherein:
the one or more control frames indicate a capability to communicate via the second wireless protocol; and
the first radio, when assisting in the communications of the second radio, transmits the one or more control frames to offload the second radio from transmitting the one or more control frames.

\* \* \* \* \*